(12) United States Patent
Danhauer et al.

(10) Patent No.: US 6,558,282 B2
(45) Date of Patent: May 6, 2003

(54) FABRIC CUSHION V-RIBBED BELT

(75) Inventors: Loren Elza Danhauer, Lincoln, NE (US); Frank Joseph Feuereborn, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1 day.

(21) Appl. No.: 09/765,820

(22) Filed: Jan. 20, 2001

(65) Prior Publication Data

US 2002/0098935 A1 Jul. 25, 2002

(51) Int. Cl.$^7$ ................................................. F16G 1/04
(52) U.S. Cl. ....................................................... 474/266
(58) Field of Search ................................ 474/250, 252, 474/260, 261, 266, 267

(56) References Cited

U.S. PATENT DOCUMENTS

| | | | |
|---|---|---|---|
| 3,485,707 A | 12/1969 | Spicer | 161/78 |
| 3,563,103 A | 2/1971 | Sauer | 74/233 |
| 3,818,741 A | 6/1974 | Terhune | 74/233 |
| 4,002,082 A | 1/1977 | Waugh | 74/231 C |
| 4,024,773 A * | 5/1977 | Hartman et al. | 474/263 |
| 4,083,261 A | 4/1978 | Speer et al. | 74/233 |
| 4,177,688 A | 12/1979 | Howerton et al. | 74/233 |
| 4,432,744 A | 2/1984 | Imamura et al. | 474/238 |
| 4,657,526 A | 4/1987 | Tangorra et al. | 474/261 |
| 4,892,510 A | 1/1990 | Matsuoka et al. | 474/252 |
| 4,931,118 A * | 6/1990 | Kitahama et al. | 156/138 |
| 5,382,198 A | 1/1995 | Janne | 474/205 |
| 5,674,143 A | 10/1997 | Kumazaki et al. | 474/263 |
| 6,007,897 A * | 12/1999 | Tamaki et al. | 428/161 |

FOREIGN PATENT DOCUMENTS

EP 0040908 2/1981 ............ F16G/5/08

\* cited by examiner

*Primary Examiner*—David A. Bucci
*Assistant Examiner*—Vicky A. Johnson
(74) *Attorney, Agent, or Firm*—Nancy T. Krawczyk

(57) ABSTRACT

A v-ribbed belt has a compression section, a tension section, and a load carrying section comprising longitudinal reinforcing cords intermediate of the compression section and the tension section. The compression section has at least one fabric layer and a plurality of longitudinally extending grooves forming longitudinally extending ribs. The fabric layer is distanced from the outermost surface of the longitudinally extending ribs and the untreated gauge of each fabric layer is in the range of 0.20 to 1.0 mm, with a preferred range of 0.25 to 0.75 mm.

12 Claims, 3 Drawing Sheets

FABRIC CUSHION V-RIBBED BELT

FIELD OF THE INVENTION

This invention is directed to power transmission belts. Specifically, the invention is a v-ribbed belt, wherein the v-ribbed belt has continuously extending longitudinal ribs or discontinuous ribs extending the length of the belt.

BACKGROUND OF THE INVENTION

In a conventional power transmission belt, the belt has an inner compression section, an outer tension section, and an intermediate neutral plane. Typically, helically wound reinforcing cords are located within the neutral plane and so the neutral plane is also referred to as the load carrying zone.

There are two different types of v-ribbed belts. The first is the banded poly-v belt. In a banded poly-v belt, a band of material secures multiple v-belts to each other. Methods of manufacturing the banded poly-v belt may include forming a plurality of v-belts and then applying the band of material which secures them or forming a large belting material with the helically wound reinforcing cords located off of the central line of the belting material and then cutting grooves in the belting material to form the plurality of extending longitudinal ribs, the depth of the groove extending beyond the location of the reinforcing cords. In banded poly-v belts manufactured by these methods, each v-rib acts independently during operation of the entire belt and each rib has an its own neutral plane. One such banded poly-v belt is disclosed in U.S. Pat. No. 4,177,688.

In the second type of v-ribbed belt, the neutral place of the entire belt is located above the continuous grooves. The v-ribbed belt may be manufactured by either molding the continuous grooves and ribs or by forming a belting material and then cutting the grooves in the belting material. Molded v-ribbed belts are disclosed in U.S. Pat. Nos. 3,818,741, 4,657,526, and 4,892,510. Cut poly v-belts are disclosed in U.S. Pat. Nos. 4,432,744 and 5,674,143.

V-ribbed belts may also be provided with lateral grooves; such lateral grooves extending either traverse to the belt or at an angle relative to the traverse direction of the belt. Such cogged v-ribbed belts are disclosed in U.S. Pat. Nos. 4,002,082 and 5,382,198. By inclining the lateral grooves at an angle relative to the transverse direction, the belt has quieter noise properties than when the grooves extend in the transverse direction.

SUMMARY OF THE INVENTION

The present invention is directed towards an improved power transmission belt wherein the noise generated during slip conditions is greatly reduced.

The disclosed power transmission belt has a compression section, a tension section, and a load carrying section comprising longitudinal reinforcing cords intermediate the compression section and the tension section. The compression section has at least one fabric layer and a plurality of longitudinally extending grooves forming longitudinally extending ribs. The at least one fabric layer is distanced from the outermost surface of the longitudinally extending ribs. The untreated gauge of each fabric layer is in the range of 0.20 to 1.0 mm with a preferred range of 0.25 to 0.75 mm.

In one aspect of the invention, the outermost fabric layer is spaced from the outermost surface of the rib by a distance x that is 5% to 50% of the depth y of the longitudinally extending grooves.

The fabric in the compression section has a thickness gauge t that is 6% to 50% of the depth y of the longitudinally extending grooves. The compression section may have up to five layers of fabric.

Also disclosed is a power transmission belt having a compression section, a tension section, and an intermediate load carrying section. The compression section has at least one fabric layer, a plurality of longitudinally extending grooves, and a plurality of transversely extending grooves. The untreated gauge of each fabric layer is in the range of 0.20 to 1.0 mm, the preferred gauge range is 0.25 to 0.75 mm.

In one aspect of the disclosed belt, the at least one fabric layer is spaced from the outermost surface of the rib by a distance x that is 5% to 50% of the depth y of the longitudinally extending grooves.

Also, the transverse grooves in the power transmission belt are inclined at an angle of 20° to 80° relative to the longitudinal grooves and preferably have a depth less than the depth of the longitudinal grooves.

BRIEF DESCRIPTION OF THE DRAWINGS

The invention will be described by way of example and with reference to the accompanying drawings in which:

FIG. 1A illustrates a close up of the ribs of the v-ribbed belt of FIG 1;

DETAILED DESCRIPTION OF THE PREFERRED EMBODIMENTS

Figure 1:
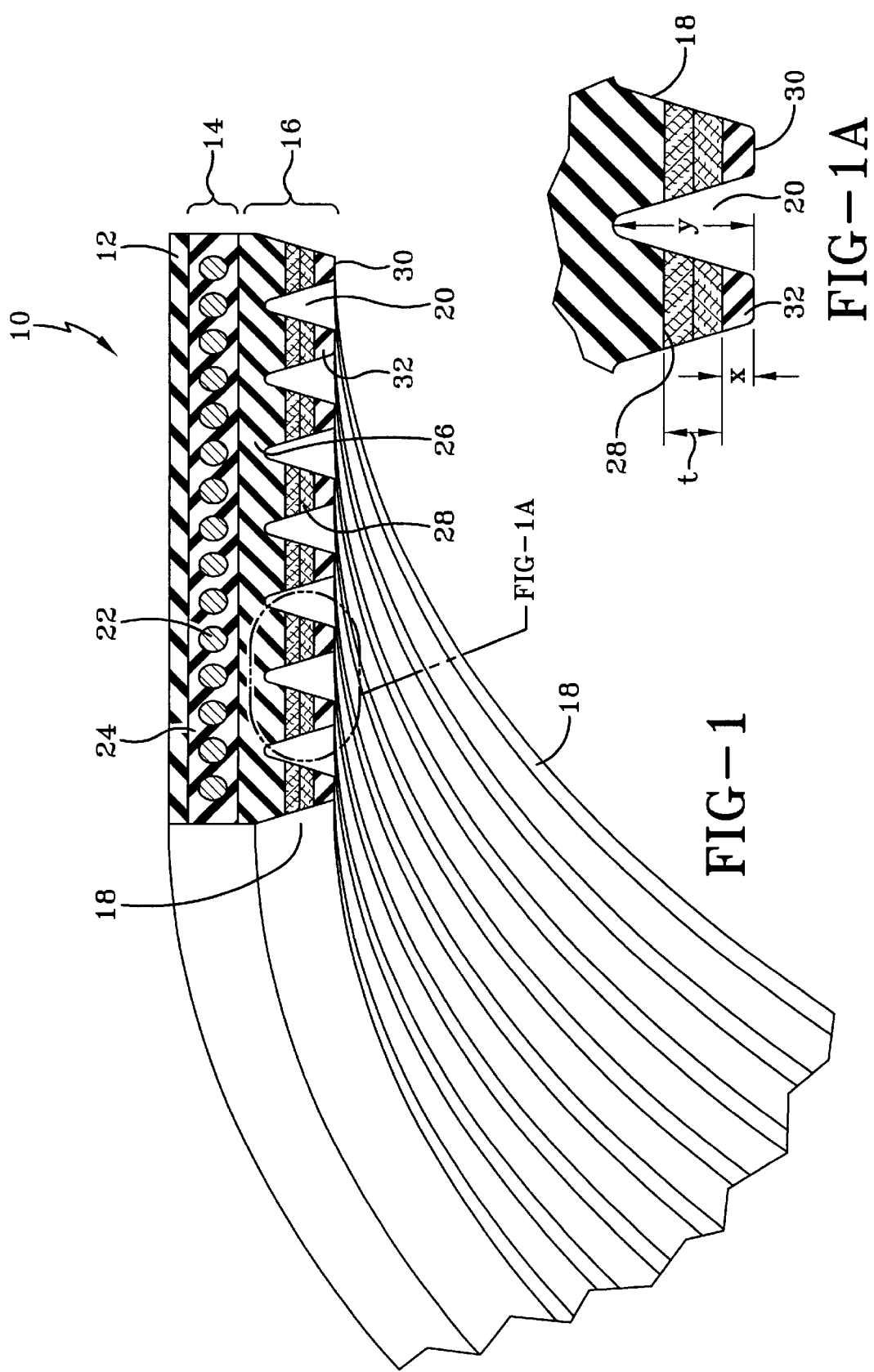
FIG. 1 illustrates a v-ribbed belt constructed in accordance with the present invention.

The multi-ribbed power transmission belt shown generally at 10 in FIG. 1, has a tension section 12, a load carrying section 14, and a compression section 16. The compression section has a plurality of longitudinal ribs 18 with a plurality of longitudinal grooves 20. The load carrying section 14 has longitudinal reinforcing cords 22 embedded in a suitable material 24.

The tension section 12 of the belt is formed from elastomeric materials. The elastomers may be any one of those known to be suitable for use in such belts, e.g., polychloroprene, polyurethane, NBR, IIR, IR, SBR, CSM, EPDM, other thermosets, thermoplastic elastomers and other polymer alloys.

The material 24 of the load carrying section 14 of the belt can also be made of any suitable material known in the art. The reinforcing cords 22 are preferably helically wound cords having individual turns arranged in substantially equally spaced relation across the belt body. The cords 22 may be made from glass fiber, carbon fiber, steel, polyester, high tenacity rayon, polyaramide, or a blend of any of these materials.

The compression section 16 is formed from a combination of elastomeric material 26 and at least one layer of fabric 28. The elastomeric material 26 may be any suitable material known in the art, such as those employed in the tension section 12. The elastomeric material 26 may also be reinforced with discrete fibers. Preferably the fibers are laterally extending and have portions projecting from the side surfaces of the longitudinal ribs 18.

The outermost fabric layer 28 is distanced from the outermost surface 30 of the ribs 18 by a distance x. The longitudinally extending grooves have a depth y, and the distance x of the fabric layer is less than y, but greater than zero. Preferably, the distance x is 5% to 50% of the groove depth y. Thus, there is always an elastomeric layer 32 at the surface of the ribs 18 which prevents the fabric layer 28 from being the surface material at the rib surface 30. The only exposure of the fabric layers 28 is along the sides of the ribs 18 after the longitudinal grooves have been skived into the belt 10 after curing.

The fabric layer 28 has an overall thickness t. The thickness t of the fabric layer relative to the groove depth y is 6 to 50%, with a preferred thickness t of 8% to 35% of the groove depth y. The type of fabric used in the fabric layer may be woven, non-woven, or knit fabric. The type of material used may be cotton, rayon, nylon, aramid, polyester, or any blend of these materials. In the preferred construction, a knit fabric of 50/50 cotton polyester yarns is used. Whatever fabric type is used, untreated gauge of each fabric layer is in the range of 0.20 to 1.0 mm with a preferred range of 0.25 to 0.75 mm.

Preferably, the fabric is selected to permit elastomer to penetrate, or strike through, the fabric to create the outermost elastomer layer 32. If instead of allowing the elastomeric material to strike through the fabric, it is chosen to lay up the belt materials with an elastomeric layer on both sides of the fabric, the fabric must still be able to stretch enough to form any necessary tooth configuration in the mold. The fabric may also be dipped in conventional adhesive treatments to improved adhesion of the fabric to the adjacent elastomer layers; however, dipping of the fabric may not be required due to the sufficient penetration of the elastomeric material 26 through the fabric layers 28 during molding.

The illustrated belt 10 has two fabric layers 28. The belt may have only one fabric layer 28 or as many as five layers. If there are too many fabric layers 28, then enough elastomeric material 26 may not sufficiently penetrate through the fabric layers 28 to form the outermost elastomer layer 32.

Figure 2:
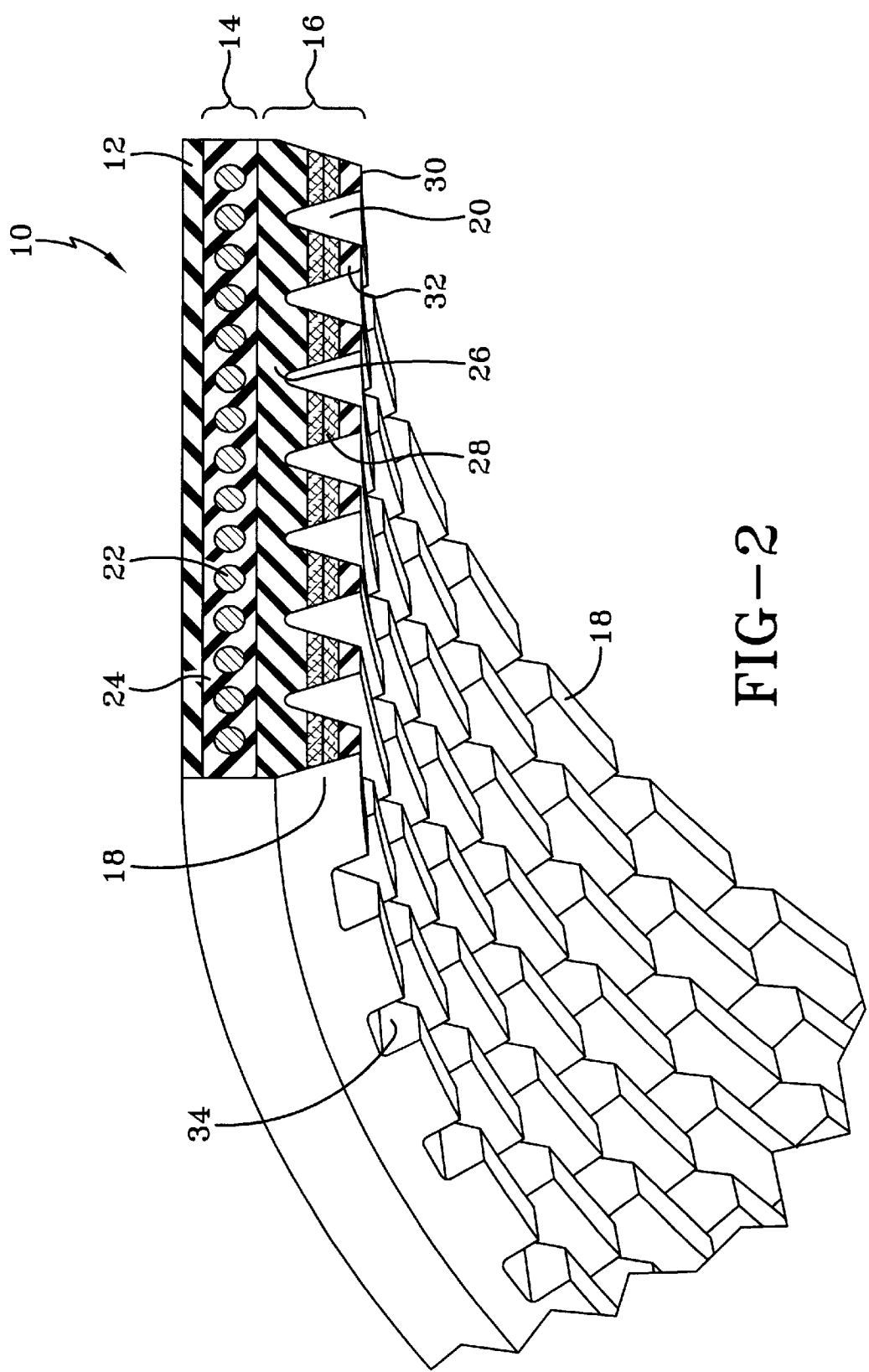
FIG. 2 illustrates a cogged v-ribbed belt constructed in accordance with the present invention.
Figure 3:
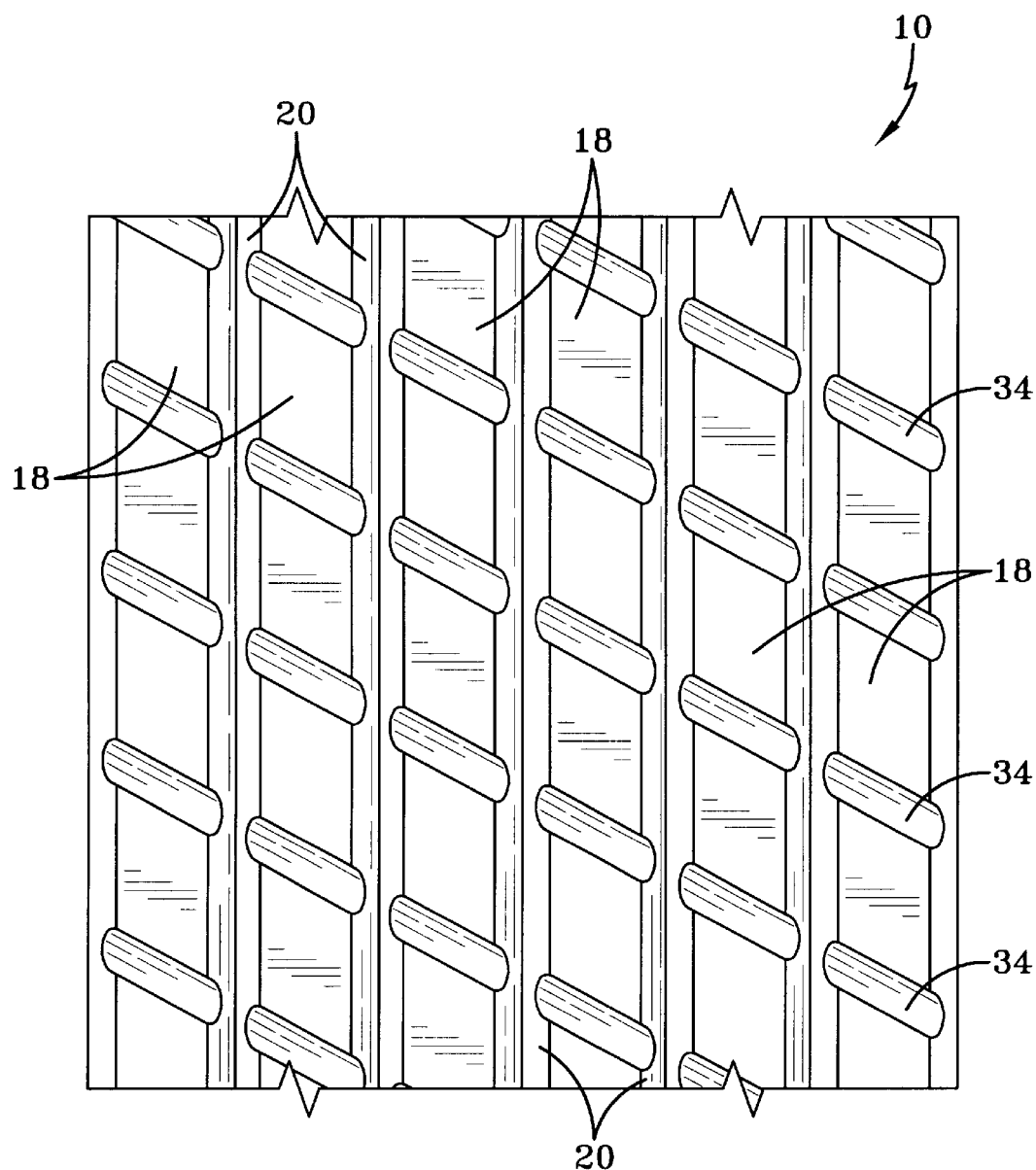
FIG. 3 illustrates a prior art v-ribbed belt groove pattern applicable with the present invention.

FIG. 2 illustrates another embodiment of the belt 10. The belt 10 is provided with transverse grooves 34. The grooves 34 may be inclined at any angle across the width of the belt and are preferably inclined at angles of 20° to 85° relative to the longitudinal grooves 20. The grooves 34 also may be pitched as disclosed in U.S. Pat. No. 5,382,198 wherein the plurality of parallel transverse grooves are spaced by a pitch length such that any transverse groove in adjacent longitudinal ribs 18 are off-set from each other in the longitudinal direction of the belt 10 by a distance of 10% to 50% of the pitch length, see FIG. 3. Also, the transverse grooves 34 have a depth equal to less than the depth of the longitudinal grooves 20.

Placing the fabric layer 28 in the compression section 16 of the belt 10 as an internal layer of the belt 10 provides an increased cushioning effect in the rib. Due to the exposure of the fabric layers 28 in the longitudinal grooves 20 after milling of the grooves 20, the belt 10 has a greatly reduced tendency to emit a squealing noise during forced slip conditions with an associated pulley. Such conditions are common on many automotive applications during start up, shut down, and rapid acceleration and deceleration of the engine.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the fill intended scope of the invention as defined by the following appended claims.

What is claimed is:

1. A power transmission belt having a compression section, a tension section, and a load carrying section comprising longitudinal reinforcing cords intermediate the compression section and the tension section, wherein the compression section has at least one fabric layer and a plurality of longitudinally extending grooves forming longitudinally extending ribs, the belt being characterized by:

the at least one fabric layer is distanced from the outermost surface of the longitudinally extending ribs and is spaced from the outermost surface of the rib by a distance x that is 5% to 50% of the depth y of the longitudinally extending grooves, and the untreated gauge of each fabric layer is in the range of 0.20 to 1.0 mm.

2. A power transmission belt in accordance with claim 1, wherein the untreated gauge of each fabric layer is in the range of 0.25 to 0.75 mm.

3. A power transmission belt in accordance with claim 1 wherein the at least one fabric layer has a thickness gauge t that is 6% to 50% of the depth y of the longitudinally extending grooves.

4. A power transmission belt in accordance with claim 1 wherein the compression section has not more than five fabric layers.

5. A power transmission belt in accordance with claim 1 wherein the compression section has a plurality of transversely extending grooves.

6. A power transmission belt having a compression section, a tension section, and an intermediate load carrying section, wherein the compression section has at least one fabric layer 28, a plurality of longitudinally extending grooves, and a plurality of transversely extending grooves, the belt being characterized by:

the at least one fabric layer is distanced from the outermost surface of the longitudinally extending ribs and is spaced from the outermost surface of the rib by a distance x that is 5% to 50% of the depth y of the longitudinally extending grooves, the untreated gauge of each fabric layer is in the range of 0.20 to 1.0 mm.

7. A power transmission belt in accordance with claim 6 wherein the at least one fabric layer has a thickness gauge t that is 6% to 50% of the depth y of the longitudinally extending grooves.

8. A power transmission belt in accordance with claim 6 wherein the transverse grooves are inclined at an angle of 20° to 80° relative to the longitudinal grooves.

9. A power transmission belt having a compression section, a section, and a load carrying section comprising longitudinal reinforcing cords, the load carrying section being intermediate of the compression section and the tension section, wherein the compression section is comprised of a plurality of longitudinally extending grooves forming longitudinally extending ribs and at least two directly adjacent fabric layers wherein the adjacent fabric layers are distanced from the outermost surface of the longitudinally extending ribs and the at least two adjacent fabric layers are spaced from the outermost surface of the rib by a distance x that is 5% to 50% of the depth y of the longitudinally extending grooves, and the untreated gauge of each fabric layer is in the range of 0.20 to 1.0 mm.

10. A power transmission belt in accordance with claim 9 wherein the at least two adjacent fabric layers have a total thickness gauge t that is 6% to 50% of the depth y of the longitudinally extending grooves.

11. A power transmission belt in accordance with claim 9 wherein the compression section has not more than five directly adjacent fabric layers.

12. A power transmission belt in accordance with claim wherein the compression section has a plurality of transversely extending grooves.

* * * * *